United States Patent

Hattori et al.

[11] Patent Number: 5,590,489
[45] Date of Patent: Jan. 7, 1997

[54] METHOD FOR GROWING FRUIT BODY OF *FISTULINA HEPATICA*

[75] Inventors: Ryuichi Hattori; Hisashi Tanaka, both of Yotsukaido, Japan

[73] Assignee: House Foods Corporation, Higashi-Osaka, Japan

[21] Appl. No.: 305,353

[22] Filed: Sep. 13, 1994

[51] Int. Cl.⁶ ............................................. A01G 1/04
[52] U.S. Cl. ................................................. 47/1.1
[58] Field of Search ................................... 47/1.1

[56] References Cited

U.S. PATENT DOCUMENTS

| | | | |
|---|---|---|---|
| 4,083,144 | 4/1978 | Fuzisawa | 47/1.1 |
| 4,852,297 | 8/1989 | Moren | 47/1.1 |
| 4,977,702 | 12/1990 | Fortin et al. | 47/1.1 |
| 5,123,203 | 6/1992 | Hiromoto | 47/1.1 |

FOREIGN PATENT DOCUMENTS

| | | | |
|---|---|---|---|
| 2750009 | 5/1978 | Germany. | |
| 2932985 | 3/1980 | Germany. | |
| 3618894 | 12/1987 | Germany. | |
| 3736957 | 5/1989 | Germany | 47/1.1 |
| 52-44603 | 11/1977 | Japan. | |
| 54-27912 | 9/1979 | Japan. | |

OTHER PUBLICATIONS

Pilzanbau; Biotechnologie der Kulturspeisepilze, UV 353 e 1=2, pp. 29–30 and 157–158, Jan Lelley.

*Primary Examiner*—James R. Feyrer
*Attorney, Agent, or Firm*—Oblon, Spivak, McClelland, Maier & Neustadt, P.C.

[57] ABSTRACT

There is disclosed a method for growing fruit bodies of *Fistulina hepatica* which comprises the steps of cutting off some parts of side wall of a cultivation vessel close to the fruit body primordium-forming part on a solid medium contained in the vessel having at least the bottom and side walls to form perforations on the wall, and making the fruit bodies to grow out of the vessel through the perforations. By this method, the large mature fruit bodies can be efficiently obtained in a short period of time.

13 Claims, 1 Drawing Sheet

METHOD FOR GROWING FRUIT BODY OF *FISTULINA HEPATICA*

BACKGROUND OF THE INVENTION

The present invention relates to a method for growing fruit bodies of *Fistulina hepatica*, which is capable of efficiently forming large mature fruit bodies of *Fistulina hepatica*. The present invention also relates to a method for forming fruit bodies of *Fistulina hepatica* as well as to a method for the inoculation.

*Fistulina hepatica* is called "beef steak mushroom" as well and naturally grows on a chinquapin tree around May and June or around October. The fruit body (pileus) of *Fistulina hepatica* has a liver-like or bovine tongue-like shape and a red to dark reddish brown surface. The fruit body has a diameter of about 10 to 20 cm.

Slices of the fresh fruit body of *Fistulina hepatica* can be eaten as they are or after frying with butter, and it is known to be a very delicious mushroom. Thus, if *Fistulina hepatica* can be grown in large amounts all the year round, it can enrich the meals and, in addition, excellent processed foods can be provided therefrom.

Although the mushroom production is increasing recently as techniques of the artificial cultivation are being developed, the varieties of the mushrooms are limited. No technique of the artificial cultivation of *Fistulina hepatica* has been established yet. Although Japanese Patent Publication for Opposition Purpose (hereinafter referred to as "J. P. KOKOKU") Nos. Sho 52-44603 and Sho 54-27912 disclose techniques of growing *Fistulina hepatica*, the object of these techniques is to obtain an antitumor substance from vegetative mycelia obtained by the cultivation of this kind of mushrooms and also from the culture medium used therefor. Namely, the object of them is not to obtain the fruit body but to grow the vegetative mycelia in a large amount.

Under these circumstances, it is demanded to develop a technique of artificially growing the mature fruit body, especially, large mature fruit body, of *Fistulina hepatica* in a short period of time.

SUMMARY OF THE INVENTION

The first object of the present invention is to provide a method for growing *Fistulina hepatica* by artificial cultivation, which makes it possible to obtain large matured fruit bodies thereof after formation of fruit body primordia.

The second object of the present invention is to provide a method for growing fruit bodies of *Fistulina hepatica* by artificial cultivation in a short period of time.

The third object of the present invention is to provide a method for inoculation of *Fistulina hepatica*, which makes it possible to spread the hyphae over the medium in a short period of time in the artificial cultivation of *Fistulina hepatica*.

The above-described objects and other objects of the present invention will be apparent from the following description and Examples.

The first aspect of the invention has been completed on the basis of a finding that when walls of a vessel surrounding the fruit body primordia are removed after the formation of the primordia on the medium to grow the fruit bodies toward the outside of the vessel, the mature fruit bodies can be efficiently obtained in a short period of time.

Namely, the first aspect of the invention provides a method for growing fruit bodies of *Fistulina hepatica*, which comprises the steps of cutting off some parts of side wall of a culture vessel close to the fruit body primordium-forming part on a solid medium contained in the vessel having at least the bottom and side walls to form perforations on the wall, and making the fruit bodies to grow toward the outside of the vessel through the perforations.

The second invention has been completed on the basis of a finding that when the hyphae of *Fistulina hepatica* are spread in the medium to obtain the medium in which it is fully filled with mycelium and the mycelium is mature enough to fruit and then the matured mycelium is cultivated under specified temperature conditions, the fruit bodies can be efficiently obtained in a short period of time.

Namely, the second aspect of the invention provides a method for growing fruit bodies of *Fistulina hepatica*, which comprises steps of (1) incubating at 10° to 30° C. for 1 to 30 days a medium in which it is fully filled with mycelium and the mycelium is mature enough to fruit body, after the hyphae of *Fistulina hepatica* are spread in the medium, it is fully filled with mycelium and the mycelium is mature enough to fruit, so as to form the fruit body primordia from the matured mycelium and (2) cultivating the fruit body primordia by keeping them at 10° to 30° C. for 10 to 40 days to develop into mature fruit bodies.

The third aspect of the invention has been completed on the basis of a finding that when the inocula of *Fistulina hepatica* are inoculated by dispersion in the whole solid medium and then the cultivation is conducted, the spawn run of *Fistulina hepatica* can be spread in the whole medium in a short period of time unlike the ordinary method for the inoculation of mushrooms.

Namely, the third aspect of the invention provides a method for the inoculation of *Fistulina hepatica*, which comprises the step of mixing the inocula of *Fistulina hepatica* with a sterilized solid culture medium for *Fistulina hepatica* to disperse the inocula in the whole culture medium.

BRIEF DESCRIPTION OF THE DRAWING

In FIG. 1, 1 indicates the container, 2 indicates the perforations, and 3 indicates the mature fruit body.

DESCRIPTION OF THE PREFERRED EMBODIMENTS

Figure 1:
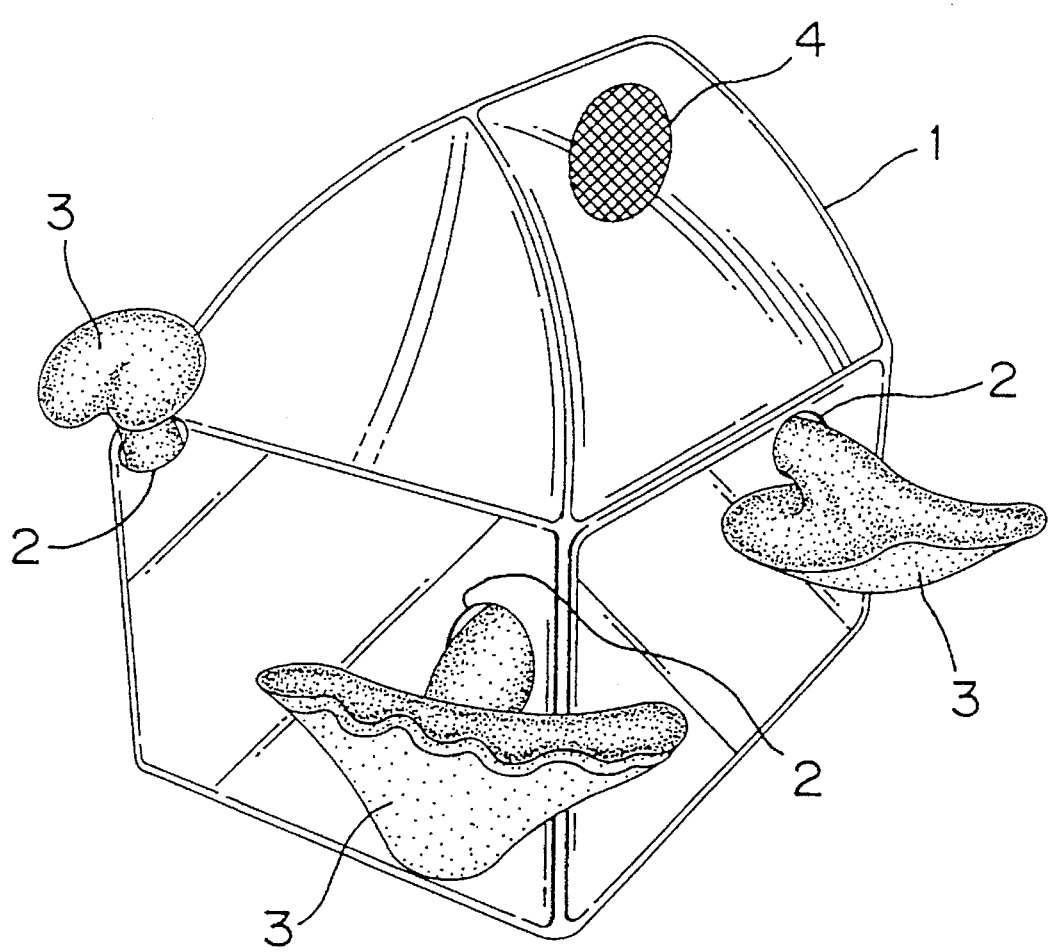
FIG. 1 illustrates fruit bodies of *Fistulina hepatica* growing out of a vessel through perforations in the vessel.

In the present invention, the mushroom inocula are inoculated on or in the culture medium by any method. Usually, the mushroom inocula are inoculated on the surface of the solid medium. This method is preferred, since the hyphae of *Fistulina hepatica* can be run in a short period of time when the inocula are inoculated over the whole solid medium by the dispersion and then the cultivation is conducted.

Although the culture medium for *Fistulina hepatica* may be either liquid or solid, the solid medium is preferred. Any suitable solid medium is usable. Among these, a solid medium comprising (a) a wooden material and (b) a nutrient comprising a saccharide and an organic nitrogen and having a pH in the range of 3.5 to 5.5 is suitable for practically carrying out the artificial cultivation, since the hyphae of *Fistulina hepatica* can run over the culture medium in a short period of time. The preferred wooden material (a) is, for example, a wood powder such as a sawdust. The wooden materials also include other powders obtained by pulverizing woods with a pulverizing machine or by chopping them and wood shavings or slices obtained with a plane or slicer.

Examples of the wooden materials include broadleaf trees such as Fagus, Chastanopsis, Pasania, Quercus, Betula, Alnus, Zelkova, Chamaecyparis, Cryptomeria, Abies, Pinus and Larix. Specifically, there are beech tree, chinquapin, *Quercus mongolica* var. grosseserrata, zelkova tree, evergreen oak, alder and white birch; and needle-leaf trees such as Japanese cedar, fir tree, Japanese larch, Japanese red pine and hinoki cypress. Particularly preferred are beech tree, pasania, Castanopsis, *Quercus serrata* and *Quercus mongolica* var. grosseserrata.

To spread the hyphae of *Fistulina hepatica* over the culture medium in a short period of time, at least 50% by weight, preferably at least 70% by weight and more preferably at least 80% by weight, of the wood material passes through a sieve having an aperture of 11.10 mm but does not pass through that of 850 μm, particularly it passes a sieve having an aperture of 6.00 mm but does not pass through that of 1.00 mm.

The nutrient (b) comprises a saccharide and an organic nitrogen. The nutrient (b) is a mixture of one or more saccharides selected from among glucose, saccharides, starches, α-starches and malt extract and one or more organic nitrogen substances selected from among amino acids, peptones and yeast extracts. Examples of the nutrients which essentially comprise both saccharide(s) and organic nitrogen substance(s) include corn nutrient additives such as granulated or pulverized corncobs and corn brans; soybean nutrient additives such as bean-curd refuse, defatted soybeans and soybean powder; nutrient additives selected from among wheat germs and the whole-grain powders of rye and oat; rice bran; wheat bran; and koji. Among these, koji is particularly preferred. It is also possible to add a saccharide and/or an organic nitrogen substance to the nutrient essentially comprising the saccharide(s) and organic nitrogen substance(s). Although the amount of the saccharide and organic nitrogen substance contained in the nutrient is not particularly limited, the saccharide content is preferably 0.1 to 90% by weight, based on the nutrient, and the organic nitrogen substance content is preferably 0.02 to 50% by weight. The ratio of the wood material to the nutrient which is not particularly limited is usually 1:1 to 9:1, preferably 3:1 to 9:1 (on dry basis). If necessary, inorganic substances and metal salts such as phosphates, magnesium salts and calcium salts may be added to the solid medium.

The solid medium containing the wood material and nutrient has a water content of 50 to 70% by weight, preferably 50 to 60% by weight and particularly preferably 56 to 58% by weight, based on the whole medium.

The pH of the solid medium after sterilization by heating is 3.5 to 5.5, preferably 4 to 5.2 and more preferably 4.2 to 5.0.

The pH of the medium varies depending on the kind and amount of the added nutrient. Therefore, the pH of the medium is controlled by, for example, adding a suitable inorganic or organic acid such as a hydrochloric acid solution, lactic acid solution, acetic acid solution or succinic acid buffer to the culture medium before or after the sterilization by heating. The pH of the medium is determined by suspending 5 g of the medium in 50 ml of distilled water, leaving the suspension to stand for 10 min and determining the pH of the suspension.

After sterilizing the solid medium by an ordinary method, the inocula in solid or liquid form are homogeneously mixed in the above-described solid medium under sterile conditions to disperse the microbes in the solid medium and then to cultivate them. The sterilized solid medium is mixed with the inocula under sterile conditions realized with a clean bench or the like to form the solid medium comprising a substantially homogeneous mixture with the inocula and then the cultivation is started. Alternatively, when the inocula which can be poured into apertures of the sterilized medium, such as liquid inocula, are used, the solid medium thus containing the inocula homogeneously dispersed therein is used to start the cultivation. Although the amount of the inocula to be dispersed in the solid medium is not particularly limited, it is preferably at least 0.4 part by weight, more preferably 0.4 to 20 parts by weight and most preferably 1 to 10 parts by weight for 100 parts by weight of the solid medium.

In particular, the solid medium is suitably fed into a vessel and then sterilized. This vessel is preferably the same as the vessel to be used for growing the fruit body of *Fistulina hepatica* toward the outside of the vessel after the inoculation of the inocula. The vessel must have at least the bottom and side walls. Preferred is a sealed vessel having a filter permeable to gases such as oxygen and carbon dioxide but impermeable to spores or the like, and particularly preferred is a plastic bag the walls of which can be easily cut. Among these, more preferred is a transparent or semitransparent vessel, since the fruit body primordia of *Fistulina hepatica* growing in the vessel can be observed from the outside.

Particularly preferred are flexible plastic bags made of a film of a polyolefin such as polyethylene or polypropylene, a polyester such as polyethylene terephthalate, or nylon or multi-layer film of them. The thickness of the film is preferably about 10 to 80 μm. Although no filter is necessitated when the plastic film per se is permeable to gases such as oxygen and carbon dioxide, it is usually preferred to provide a filter made of a polytetrafluoroethylene, polyvinylidene fluoride, cellulose mixed ester or polycarbonate and having venting pores of a size of 0.05 to 2 μm. Such a filter is easily available on the market. An example of them is Durapore Membrane Filter (Nippon Millipore Limited).

In the present invention, a vessel other than the above-described one can be used until the sterilization of the solid medium so that the contents of the vessel are transferred into the above-described one at the time of the inoculation. After feeding the solid medium into the vessel, the vessel is desirably sterilized by heating at, for example, 100° to 120° C. for 30 to 300 minutes.

Though the amount of the solid medium to be fed into the vessel before the inoculation and cultivation is not particularly limited, it is preferably 50 to 85% based on the capacity of the vessel.

In the present invention, the inocula inoculated in the medium in the vessel are cultivated by any suitable method to spread the hyphae of *Fistulina hepatica* in the medium, thereby obtaining the medium in which it is fully filled with mycelium and the mycelium is mature enough to fruit. Concretely, the inocula are mixed in the sterilized solid medium under sterile conditions to homogeneously spread them into the whole solid medium, and then the solid medium is kept at 15° to 32° C. for 15 to 60 days. More preferably, the cultivation is conducted in a dark place at a temperature of around 25° C. and at a relative humidity of 50 to 85%, so that the hyphae spread in the whole solid medium in a time shorter than that necessitated in ordinary methods.

Thus, the cultivation can be continued under suitable conditions. The hyphae of *Fistulina hepatica* spreads in the medium to be the matured mycelium, which are then cultivated preferably at 10° to 30° C. for 1 to 30 days to form the fruit body primordia. More preferably, the cultivation is conducted at 15° to 20° C. at a relative humidity of at least 70% (particularly 75 to 90% ) while the light intensity is controlled in the range of 50 to 1,000 lx. Particularly preferred is that the matured mycelium is obtained by the cultivation in a dark place and then they are cultivated in a illuminated place at a temperature lower than the cultivation temperature by 2° to 15° C., preferably 5° to 12° C.

After thus forming the fruit body primordia, the vessel is partially cut at portions around the fruit body primordia so that each of the fruit bodies of *Fistulina hepatica* can grow out of the vessel through the perforation. The vessel is partially cut in such a manner that the wall of the vessel is cut to form a perforation near the fruit body primordium or, alternatively, a part of the wall or the top surface of the vessel is cut off to form a round perforation having a diameter of about 2 cm around the fruit body primordium. The size and shape of the perforation are such that the growing fruit body is not physically brought into contact with the cultivation vessel, since the growth thereof is inhibited by the vessel wall. It is desirable, however, that the area of the perforation is as small as possible. The cultivation vessel must be treated carefully, since when the medium or fruit body primordium is bruised or physically damaged, the fruit body does not grow or the fruit body primordium or small fruit body is apt to be reabsorbed.

By the above-described treatment, the fruit body of *Fistulina hepatica* grows out of the vessel through the perforation formed by the cutting and as a result, the large, mature fruit body is obtained in the present invention. Since the major part of the medium is thus covered by the cultivation vessel, the medium per se is prevented from being dried and the temperature and high humidity in the medium are kept constant to make the extremely efficient growth of the fruit body of *Fistulina hepatica* possible.

It is preferred to obtain the mature fruit body by keeping the temperature at 10° to 30° C. for 10 to 40 days. More preferred conditions comprise a temperature of 15° to 20° C., relative humidity of at least 90% (particularly 95 to 98% ) and light intensity of 50 to 1000 lx. Particularly preferred is that after the formation of the fruit body primordia, the culture is conducted under a high-humidity condition realized by increasing the humidity by at least 5%.

The fruit bodies of *Fistulina hepatica* growing out of the vessel through the perforations in the vessel are shown in FIG. 1. In FIG. 1, 1 indicates the vessel, 2 indicates the perforations in the vessel, 3 indicates the fruit bodies of *Fistulina hepatica*, and 4 indicates a filter.

The following Examples will further illustrate the present invention.

EXAMPLE 1

Water was added to a mixture of 534 g (100% by weight based on the whole) of beech tree chips having such a size that they did not pass through a sieve having an aperture of 2 mm but passed through that of 6 mm and 178 g of dry koji to obtain a solid medium having a water content of 60% by weight. Then the solid medium thus obtained was fed into a mushroom cultivation pouch having a capacity of 2.5 kg and provided with a filter (trade name: Kinopack; a product of Nissho Kabushiki Kaisha) so as to obtain a density of 0.5 g/cm$^3$, and then sterilized by heating at 121° C. for 60 min. The solid medium thus sterilized by heating had a pH of 4.9.

Then 17 g of inocula of *Fistulina hepatica* (obtained by cultivation in a medium having the same composition as that of the above-described solid medium) were added, under sterile conditions, to the solid medium sterilized by heating to homogeneously disperse the former in the latter.

The solid medium was kept at a temperature of 25° C. and at a humidity of 85% in a dark place for 25 days to spread the hyphae of *Fistulina hepatica* in the medium.

Comparative Example 1

A solid medium having a water content of 60% was prepared in the same manner as that of Example 1 except that 775 g of the same beech tree chips and 178 g of the same dry koji as those used in Example 1 were used.

Then the solid medium thus obtained was fed into a mushroom cultivation pouch having a capacity of 2.5 kg and provided with a filter (trade name: Kinopack; a product of Nissho Kabushiki Kaisha) so as to obtain a density of 0.5 g/cm$^3$, and then sterilized by heating at 121° C. for 60 min. The solid medium thus sterilized by heating had a pH of 4.9. Then 17 g of inocula of *Fistulina hepatica* (obtained by cultivation in a medium having the same composition as that of the above-described solid medium) were inoculated, under sterile conditions, on the surface of the solid medium sterilized by heating.

The solid medium was kept at a temperature of 25° C. and at a humidity of 85% in a dark place. 55 days were necessitated for spreading the hyphae of *Fistulina hepatica* in the medium.

Thus, in this method, 55 days were necessitated in total for spreading the hyphae of *Fistulina hepatica* in the medium, while only 25 days were necessitated for spreading them in the medium in Example 1.

EXAMPLE 2

979 g (100% by weight based on the whole) of beech tree chips having such a size that they did not pass through a sieve having an aperture of 2 mm but passed through that of 6 mm were mixed with 178 g of dry koji. Water was added to the resultant mixture to obtain a solid medium having a water content of 60% by weight. Then the solid medium thus obtained was fed into a mushroom cultivation pouch having a capacity of 2.5 kg and provided with a filter (trade name: Kinopack; a product of Nissho Kabushiki Kaisha) so as to obtain a density of 0.5 g/cm$^3$, and then sterilized by heating at 121° C. for 60 min. The solid medium thus sterilized by heating had a pH of 4.9. Then 17 g of inocula of *Fistulina hepatica* (obtained by cultivation in a medium having the same composition as that of the above-described solid medium) were added, under sterile conditions, to the solid medium sterilized by heating to homogeneously disperse the former in the latter.

The solid medium was kept at a temperature of 25° C. and at a humidity of 85% in a dark place for 25 days to form the matured mycelium of *Fistulina hepatica*. Then the cultivation was continued under conditions comprising a temperature of 20° C., humidity of 90% and lightness of 200 lx for 5 days to form the primordia of *Fistulina hepatica*. The cultivation was further continued under conditions comprising a temperature of 13° to 23° C., humidity of 90% or above and lightness of 200 lx for 19 days to obtain the fruit bodies.

EXAMPLE 3

781 g of beech tree chips having such a size that they did not pass through a sieve having an aperture of 2 mm but passed through that of 6 mm were mixed with 178 g of dry koji. Water was added to the resultant mixture to obtain a solid medium having a water content of 58% by weight. Then the solid medium thus obtained was fed into a mushroom cultivation pouch having a capacity of 2.5 kg and provided with a filter (trade name: Kinopack; a product of Nissho Kabushiki Kaisha, which was made of a high-density polyethylene film having a thickness of 40 μm) so as to obtain a density of 0.5 g/cm³, and then sterilized by heating at 121° C. for 60 min. The solid medium thus sterilized by heating had a pH of 4.9. Then 17 g of inocula of *Fistulina hepatica* (obtained by cultivation in a medium having the same composition as that of the above-described solid medium) were added, under sterile conditions, to the solid medium sterilized by heating to homogeneously disperse the former in the latter.

The solid medium was kept at a temperature of 25° C. and at a humidity of 85% in a dark place for 25 days to obtain medium in which it is fully filled with mycelium of *Fistulina hepatica* and the mycelium is mature enough to fruit. Then the cultivation was continued under conditions comprising a temperature of 20° C., humidity of 90% and lightness of 200 lx for 5 days to form the primordia of *Fistulina hepatica*. Parts of the walls of the pouch was cut to form round perforations having a diameter of about 2 cm around the primordia by observing them through the pouch from the outside. Then the cultivation was continued under conditions comprising a temperature of 13° to 23° C., humidity of 90% or above and lightness of 200 lx for 19 days to grow the fruit bodies out of the pouch through the perforations, whereby large mature fruit bodies of *Fistulina hepatica* could be cropped. The total cultivation period was 49 days, the yield of the fruit bodies per the solid medium was 65 g, and the average fruit body weight was 21 g.

The fruit body primordia of *Fistulina hepatica* were formed in the same manner as that of Example 3 and then the cultivation was conducted under the same conditions as those of Example 3 except that the pouch was completely removed. The yield of the fruit bodies per the solid medium was 44 g, and the average fruit body weight was 4 g.

What is claimed is:

1. A method of forming fruit bodies of *Fistulina hepatica*, which comprises:
   a) filling a cultivation vessel having at least one side wall with a solid medium;
   b) sterilizing said medium;
   c) inoculating said sterilized medium with inocula of *Fistulina hepatica*;
   d) allowing a spawn of said inocula to run through the medium;
   e) inducing said spawn to form fruit body primordia; and,
   f. exposing said fruit body primordia, to allow said fruit bodies to develop.

2. In a method for growing forest mushrooms, the improvement which comprises:
   a) selecting a variety of *Fistulina hepatica* to be cultured;
   b) after spawn has been allowed to run and induction has been performed, identifying fruit body primordia on the surface of the medium;
   c) forming an opening in the cultivation vessel over at least one primordium; and
   d) allowing fruit bodies of *Fistulina hepatica* to form through the formed opening.

3. The method of claim 2, wherein the cultivation vessel is a plastic bag.

4. The method of claim 2, wherein a cultivation vessel is a transparent vessel.

5. The method of claim 4, wherein a film constituting the cultivation vessel has a thickness of 10 to 80 μm.

6. The method of claim 2, wherein after the fruit body primordia are obtained by the cultivation in a dark place, the fruit bodies of *Fistulina hepatica* are grown out of the vessel under conditions comprising a temperature of 15° to 20° C., relative humidity of 70% or above and a light intensity of 50 to 1,000 lx.

7. The method of claim 2, wherein a solid culture medium containing (a) a wood material and (b) a nutrient comprising a saccharide and an organic nitrogen and having a pH in the range of 3.5 to 5.5 is used.

8. The method of claim 7, wherein the solid culture medium has a water content of 50 to 70% by weight.

9. The method of claim 2, which comprises mixing inocula of *Fistulina hepatica* with a sterilized solid culture medium to disperse the inocula in the whole medium, the culture medium containing at least 50% by weight of a wood material which passes through a sieve having an aperture of 11.10 mm but does not pass through that of 850 μm.

10. The method of claim 2, which comprises:
    a) spreading hyphae of *Fistulina hepatica* in a solid medium in a sealed transparent plastic vessel provided with a filter permeable to a gas, but impermeable to spores to obtain a medium which is fully sealed with mycelium, said mycelium being sufficiently mature to fruit;
    b) cultivating the medium at 10° to 30° C. through a time sufficient to form said fruit body primordia from mature mycelium;
    c) cutting off parts of the vessel around the primordia of *Fistulina hepatica*; and
    d) maintaining said primordia at 10° to 30° C. in a lighted area of 50 to 1,000 lx for a time sufficient to develop said primordium into mature fruit bodies of *Fistulina hepatica* out of the vessel through the perforation;
    and wherein said solid culture medium contains a wood material and a nutrient comprising a saccharide and organic nitrogen and having a pH in the range of 3.5 to 5.5.

11. The method of claim 10, which comprises mixing inocula of *Fistulina hepatica* with a sterilized solid culture medium to disperse the inocula in the whole medium, the culture medium containing at least 50% by weight of wood material which passes through a sieve having an aperture of 11.10 mm but does not pass through that of 850 μm.

12. The method of claim 1, wherein said cultivation vessel is selected to be a sealed vessel, which is provided with a filter, said filter being permeable to gas, but being impermeable to spores.

13. The method of claim 2, which comprises:
    a) having a spawn run comprising incubating a medium at 10° to 30° C. for a time sufficient for said medium to he fully filled with mycelium, which are sufficiently mature to produce fruit body primordia, so as to form fruit body primordia from matured mycelium;
    b) forming openings by cutting off parts of the vessel close to the fruit body primordia to form perforations; and
    c) cultivating the fruit body primordia by maintaining the vessel at 10° to 30° C. until mature fruit bodies are formed through said perforations.

* * * * *